June 21, 1960

C. M. BALDWIN, JR., ET AL 2,942,053

ELECTRIC BATTERY

Filed July 10, 1956

INVENTORS:
CLAUDE M. BALDWIN, Jr., HUBERT F. BAUMAN,
WILLIAM S. GRAFF, RICHARD F. GREEN,
& H. LEON SKEEN.

by *Stewart F. Moore*
ATTORNEY.

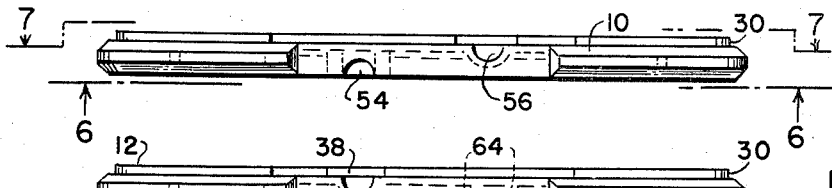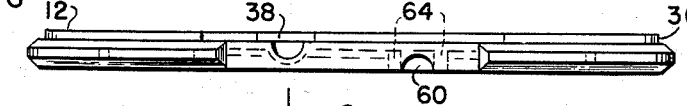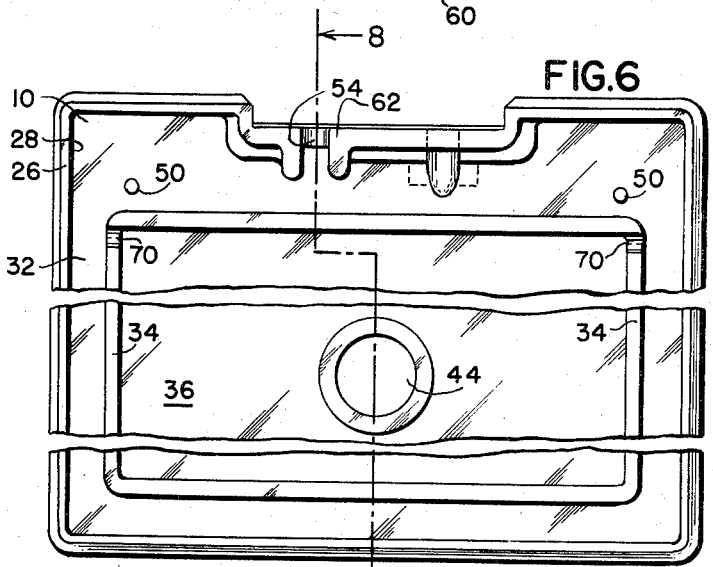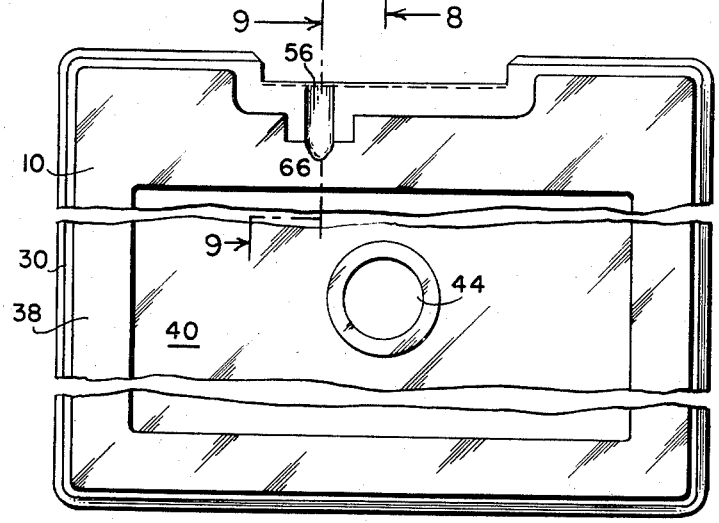

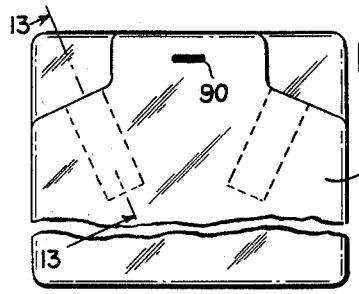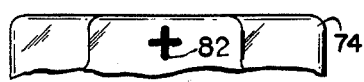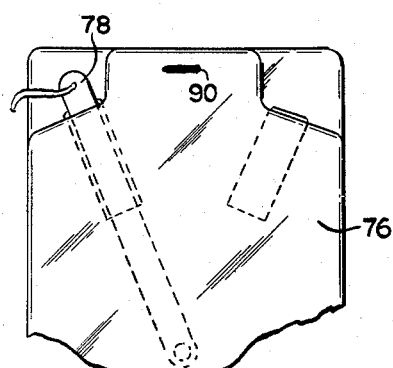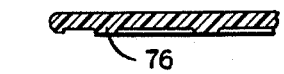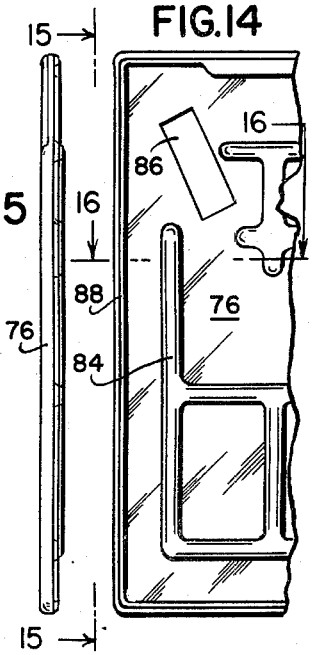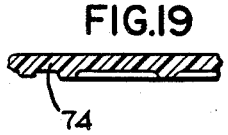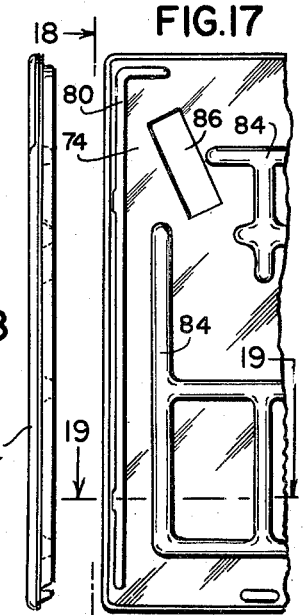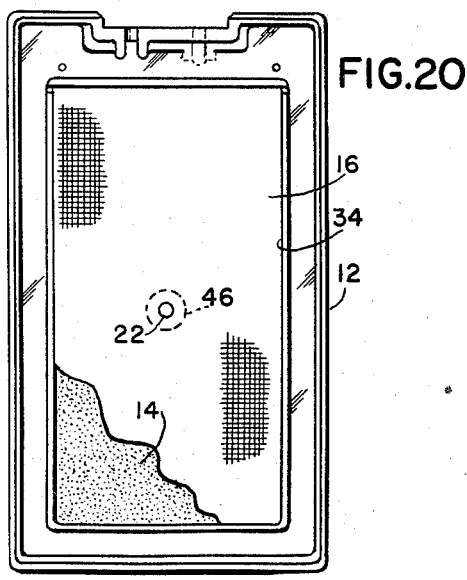

June 21, 1960   C. M. BALDWIN, JR., ET AL   2,942,053
ELECTRIC BATTERY

Filed July 10, 1956   4 Sheets-Sheet 4

INVENTORS:
CLAUDE M. BALDWIN, Jr., HUBERT F. BAUMAN,
WILLIAM S. GRAFF, RICHARD F. GREEN,
& H. LEON SKEEN.

by Stewart F. Moore
ATTORNEY.

United States Patent Office 2,942,053
Patented June 21, 1960

2,942,053

ELECTRIC BATTERY

Claude M. Baldwin, Jr., Hubert F. Bauman, and William S. Graff, Raleigh, N.C., Richard F. Green, Jacksonville, Fla., and Hobson Leon Skeen, Decatur, Ala., assignors, by mesne assignments, to The Electric Storage Battery Company Filed July 10, 1956, Ser. No. 597,010

8 Claims. (Cl. 136—6)

This invention relates to an improved battery construction which may be used for either primary or storage type batteries. While the construction is independent of any particular chemical nature of the electrodes or electrolyte, it is particularly adaptable to the silver zinc type battery. Such batteries generally utilize an alkaline electrolyte in conjunction with a positive electrode formed from silver oxide or silver peroxide and a negative material electrode formed from zinc material.

Lightweight batteries of comparatively small size but with high electrical output per unit weight are particularly desirable where the weight of the battery is a prime design consideration. The silver zinc type alkaline battery fulfills these requirements, but has the disadvantage of relatively high cost and practical construction difficulties which heretofore have made such batteries a laboratory production item. The high cost of such batteries has resulted chiefly from the tedious hand labor methods of construction heretofore employed.

In the past, each individual electrode for each single cell has been made separately, wrapped in a particular fashion with suitable separator material, and then placed with a correspondingly processed and wrapped electrode of opposite polarity in an individual cell container, whereupon it is then filled with electrolyte and sealed. To assemble such a battery, a plurality of cells must then be interconnected in some fashion. All of these steps are time consuming and do not lend themselves to modern high speed production techniques.

The present invention involves the elimination of individually wrapped electrodes, the fabricating of electrodes as integral units with intercell barriers, and the assembling of a battery by merely stacking a desired number of such intercell units. According to the teaching of the present invention, a battery of any size or output voltage may be produced with high speed techniques by merely scaling up or down like unitary components.

It is therefore an object of the invention to provide a new battery structure which has maximum strength and lightness and which is adapted to high production techniques.

It is a further object of the invention to provide a battery which is adapted for use with electrodes of any desired size, number or chemical composition.

Other objects and advantages will be better understood in relation to the accompanying drawings in which:

Fig. 4 and Fig. 5 are plan views of a pair of adjacent electrode supports.

Fig. 6 is a side elevation of an electrode support as seen from line 6—6 of Fig. 4.

Fig. 7 is a side elevation of a support plate as seen from line 7—7 of Fig. 4.

Fig. 8 is a sectional end elevational of an electrode support plate taken on line 8—8 of Fig. 6.

Fig. 9 is an enlarged partial sectional end elevation taken on line 9—9 of Fig. 7.

Fig. 10 is a side elevation of the outer side of a negative end terminal plate.

Fig. 11 is a partial side elevation of the top portion of a positive end terminal plate.

Fig. 12 is a partial side elevation of the outer side of a negative end terminal plate in conjunction with a terminal connecting strap.

Fig. 13 is a sectional end elevation of the negative end terminal plate taken on line 13—13 of Fig. 10.

Fig. 14 is a partial side elevation of the inner side of the negative end terminal plate.

Fig. 15 is an end elevation of the inner side of the negative end terminal plate taken on line 15—15 of Fig. 14.

Fig. 16 is a partial sectional plan view of the same, taken on line 16—16 of Fig. 14.

Fig. 17 is a partial side elevation of the inner side of the positive end terminal plate.

Fig. 18 is an end elevation of the same, taken on line 18—18 of Fig. 17.

Fig. 19 is a partial sectional plan view of the same, taken on line 19—19 of Fig. 17.

Fig. 20 is a side elevation of one of the electrode support plates provided with a negative material carrying screen.

For purposes of illustration, a silver zinc battery with an alkaline electrolyte will be described. However, it is understood that the battery construction is adaptable to any type storage battery and is not dependent upon the chemical composition of the electrodes or the electrolyte.

Figure 3:
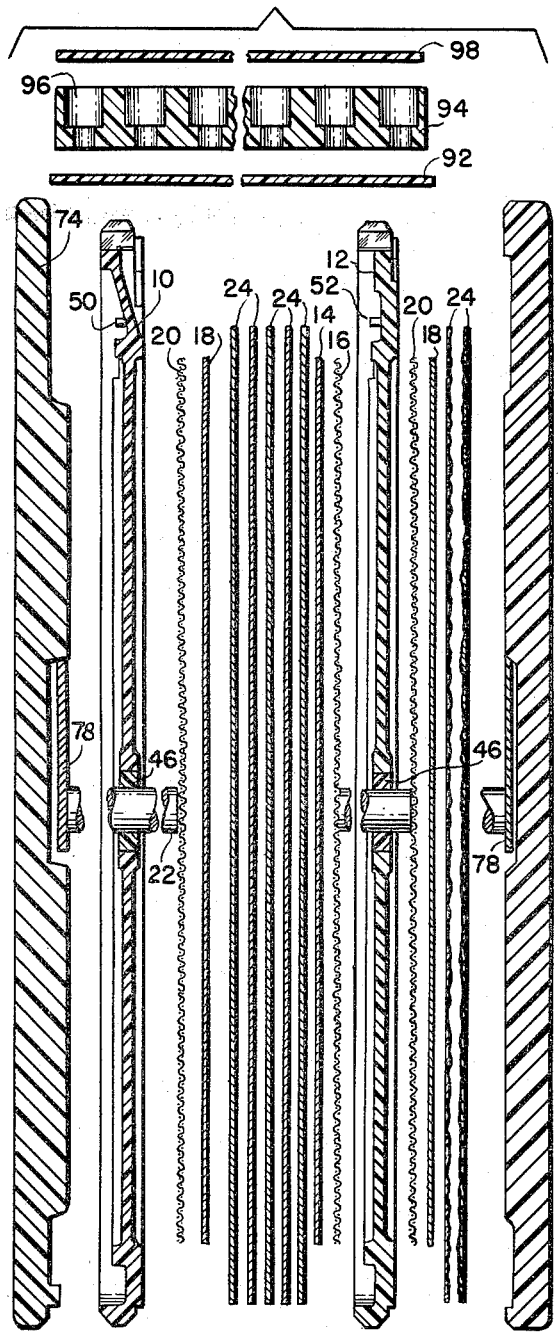
Fig. 3 is an exploded, sectional, side elevation illustrating the various components of the battery.
Figure 1:
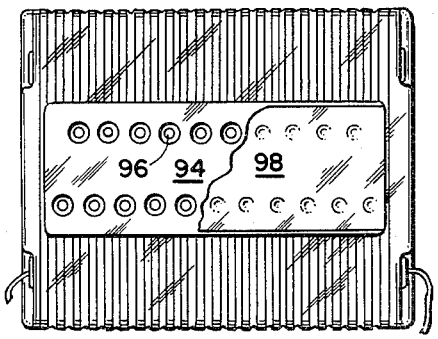
Fig. 1 is a plan view of an assembled battery.
Figure 2:
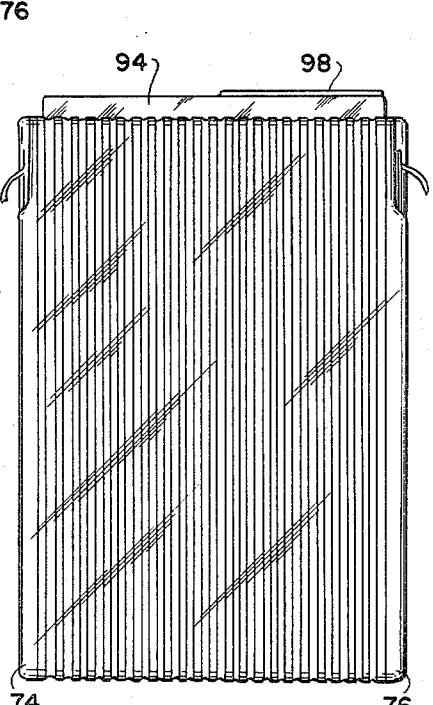
Fig. 2 is a side elevation of an assembled battery.
Figure 21:
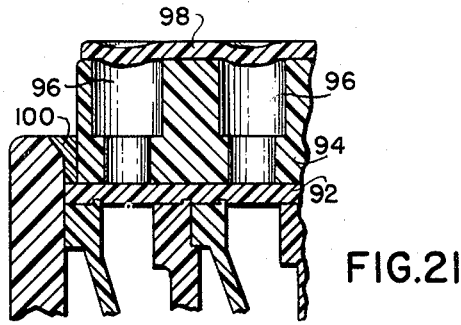
Fig. 21 is a partial sectional side elevation of the top portion of the assembled battery.

Referring now to the drawings, a battery constituting a plurality of sheet or plate-like elements with separators therebetween is assembled as shown in Figs. 1, 2, and 3. In general, each individual cell has plastic, plate-like sheets 10, 12 which carry the active electrode material. These sheets may be formed from polystyrene, for example, or any suitable moldable plastic resin may be used.

The zinc or negative electrode material 14 is supported by a screen or wire mesh 16 (Fig. 20). The positive or silver oxide material 18 is supported by a similar wire mesh or screen 20. Since the cells are adapted to be connected in series, an electrical connection is made between each screen by means of a pin 22 which passes through each sheet 10, 12 and has its ends welded to the two screens. Interposed between the electrodes are a plurality of separator sheets 24.

It has been found in silver-zinc type batteries, that comparatively little free electrolyte is needed for proper functioning of the battery. A fibrous or bibulous type separator which dips into a reservoir of electrolyte material will carry enough of the material by capillary action to the space between the electrodes so that adequate chemical action therebetween will be obtained. It has also been found that to prevent short circuits between the electrodes and still allow an ionic interchange therebetween, a semi-permeable membrane may be used. A suitable membrane material is regenerated cellulose, for example, cellophane.

For illustrative purposes then, five separator sheets are shown in Fig. 3 and may comprise one or more sheets of a bibulous material with one or more sheets of regenerated cellulosic material interposed between the bibulous separators and the electrodes. The bibulous material may be one of the synthetic fabrics, such as that known by the trade name "dynel" or "viskon," or other fibrous materials, such as blotting paper, may be used. The regenerated cellulosic material is preferably cellophane. Experiments have shown that a separator arrangement for separator 24 which provides very satisfactory battery characteristics includes a sheet of "dynel" displaced adjacent to the positive electrode, with a sheet of "viskon" next positioned adjacent to the "dynel" sheet. Two sheets of cellophane are placed next to the "viskon" to act as the semi-permeable membrane, as mentioned heretofore, while a second sheet of "viskon" is positioned between the cellophane membrane and the negative zinc electrode.

Considering the invention now in more detail, one of the novel plate-like electrode supports or intercell barriers 10 is shown in detail in Figs. 4, 6-9, 20.

As one of the features of the invention is the formation of a venting channel when pairs of electrode supports are mated with one another, it will be appreciated that the support plates 10, 12 (Fig. 3) are identical in construction with the exception of the vent construction described in more detail hereinafter. Plates 10 and 12 comprise, as mentioned heretofore, plastic sheets in which desired configurations for defining electrolyte passages and electrode cavities are molded. Thus plates 10 and 12 have on one side thereof a raised edge 26 which forms an interior wall 28 for defining the internal area of each cell. The opposite sides of plates 10 and 12 have an indented or shoulder portion 30 molded therein. Since in assembly plates 10, 12 are engaged with one another in a back to front fashion, edge 26 and walls 28 of, for example, plate 10, engages complementary portions of shoulder 30 in mating a plate, for example, plate 12, to form a tight fit therebetween.

Each plate has a molded channel 32 disposed near its perimeter which is defined by wall 28 and an inner framing rib or ridge 34. Ridge 34 in turn defines the boundaries of an inner cavity 36 which is a stepped surface recessed somewhat below the laterally extending surface of ledge 26. Cavity 36 is adapted to serve as a base for receiving one of the electrodes. The sides of plates 10 and 12 opposite to cavity 36 have a raised surface 38 molded near the outer boundaries thereof and extending inwardly from shoulder 30 to define a cavity 40 lying in register with the cavity 36, but separated therefrom by the wall thickness of each plate 10 or 12.

Cavity 40 serves as a receptacle-like base for receiving an electrode of opposite polarity to that held in cavity 36. As cavities 36, 40 define the usable electrode area, they are identical in size and are made as large as possible commensurate with adequate structural strength in order to secure maximum electrical capacity from each cell.

The cells are adapted to be connected in a series arrangement to provide a high terminal voltage. A feature of the invention is the means for providing an internal connection between cells in order to eliminate external interconnecting straps which are subject to corrosion, breakage or other damage. Thus, as shown in Figs. 3, 20, each electrode is internally connected to an electrode of opposite polarity in the next adjacent cell, by means of a metal pin 22 which passes through an aperture 44 in plates 10 or 12 and is spot welded or fastened by any other suitable means at each end to the electrodes. Intercell leakage of the electrolyte around the pin 22 is prevented by providing an O-ring 46 of resilient material, which insures a tight fitting seal between the pin 22 and the inner walls of aperture 44.

The electrode materials are held in place by respective screens 16, shown in detail in Figs. 3 and 20. Thus in assembling each plate the O ring is placed in aperture 44 and pin 22 passed therethrough. Screens 16 and 20 are then laid in place and pin 22 is affixed thereto. Each plate 10 and 12 is now ready to receive the electrode material.

The paste-like electrode material for each cell is held within its associated cavity by means of wire mesh or screens 16, 20. A plate with electrode material is fabricated in the following manner. The O ring is first placed in aperture 44 and pin 22 passed therethrough. Screens 16 and 20 are then laid in place and pin 22 is electrically joined to both screens by welding or any other suitable means. The wire mesh upon which the electrode material is deposited may be of any desired fineness fabricated from any suitable metal. It has been found that a preferred material for the positive screen is nickel, and in the case of the zinc negative electrode, a suitable material is a silver plated, copper screen.

After the screens have been affixed to each side of plate 12 or 14 and arranged to lie in register with associated cavities 36 and 40, the negative electrode material is then applied. Experiments have shown that the best negative material comprises a slurry of zinc powder or dust, water, and a polyvinyl alcohol binding material. These ingredients are first well mixed, and then a proper amount is poured into the cavity 36 so that it is filled to the level of ridge 34. The plate is then placed upon a vibrator and vibrated sufficiently to cause the slurry to fill all the area of cavity 36. Because of the vibrating action, the cavity is completely filled and presents a smooth upward surface. The plate may next be passed through a drying oven to hasten the binding of the zinc electrode material to the screen 16.

Plate 12 or 14 is then reversed and the positive electrode material is applied to screen 20 disposed on the opposite side from screen 16. A suitable positive material has been found to be a paste of silver oxide and water, and a polyvinyl alcohol binder. In the case of the positive electrode, the material may be pasted directly to its binding screen with a spatula or other suitable tool. Cavity 40 is thus filled with material to the level of raised surface 38. Since surface 38 defines the highest elevation of the positive side of cell plate 14, the material may be pasted within cavity 44 until it is filled to overflowing and then the excess may be scraped therefrom with a suitable tool. Thus, ridge surface 38 acts as a gauge for filling the positive cavity 40 with the proper amount of electrode material.

After the positive electrode material has hardened and bound itself to its associated screen 20, the plates are ready to be assembled with mating plates which likewise have been filled with electrode material. As mentioned above, it is preferable to use several layers of separator materials 24 of the bibulous and regenerated cellulose type. Accordingly, these materials are cut to a size sufficient to cover completely the electrode area defined by cavities 36, 40 and have edges overlying ridge 34 in order to engage with chanel 32 (Fig. 22).

Ridge 34 is recessed below the edge 26 of wall 28. When the positive side of one plate 10 or 12 is mated with the negative side of a corresponding plate, the separators are securely fixed in position therebetween because of pressure developed between registering ridges 34 and 38 on complementary plates. It will be seen that the separators are securely clamped in position between a positive and negative electrode with edges securely sealed by ridges 34 and 38 so that it is impossible for electrode material to drop to the bottom of the cell and migrate by electrolyte flow or otherwise to an electrode of opposite polarity and thereby short out the cell. Thus, prevention of internal shorts is secured without the necessity of intricate, complex wrappings of the plates within sheets of separators.

Figure 22:
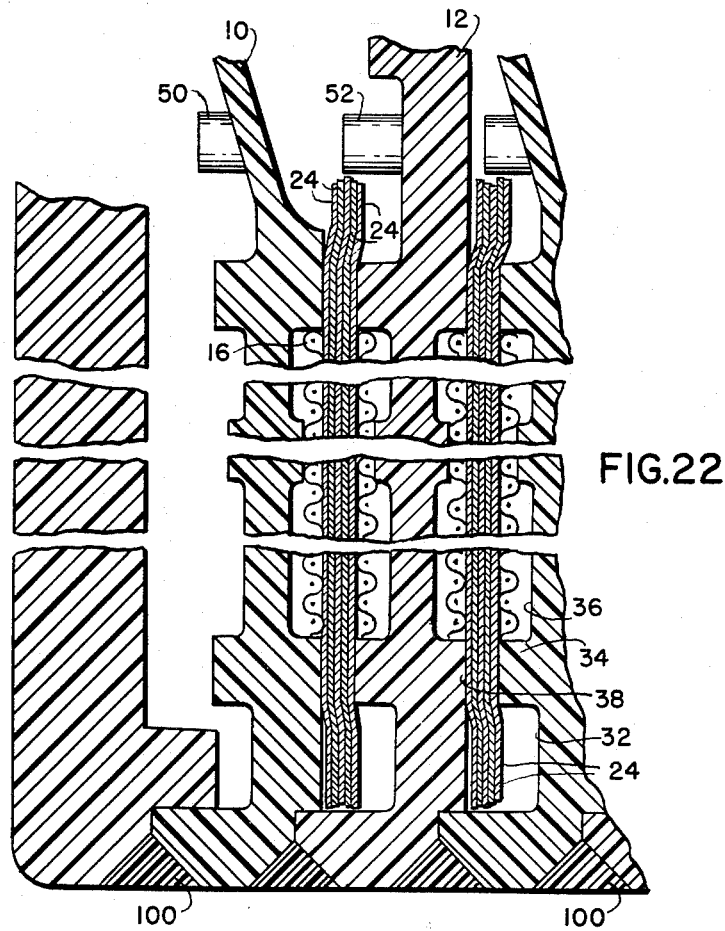
Fig. 22 is a partial sectional side elevation of the assembled battery.

Raised pins 50, 52, shown in Figs. 6, 22, are molded in the negative side of plate 10, 12 and serve to hold the top edge of separators 24 in position while the plates are being assembled.

The upper portion of each plastic plate 10 and 12 has a pair of channels 54, 56 and 58, 60, respectively, molded therein which lead outwardly from the interior of each cell (Figs. 4-7). Channels 54 and 60 are identical in construction, but are in reversed relationship with respect to comparable sides of plates 10 and 12. Similarly channels 56, 58 are of identical configuration but are in reversed relationship to channels 54, 56. Channels 54 and 60 have upwardly extending edges 62, 64 respectively which are of the same surface height as wall 28. Edges 64 are adapted to engage in register with complementary depressions 66 in plate 10, and edges 64 are adapted to engage with like depressions in plate 12 when a plate similar to the plates 10, 12 is arranged in assembled relationship. This engagement between the channel edges and corresponding depressions assures correct alignment between corresponding vent structures.

When plates 10 and 12 are assembled back to front, respectively, conduits or channels 56 and 60 lie in proper register with each other to form a vent tube which serves to conduct liquid electrolyte into the interior of the cell during the filling operation and further serves to act as an exit for gases during the active life of the battery. Grooves or slots 70 are molded into the upper end of ridge 34 on each side to provide a path for conducting escaping gases generated between the electrodes into electrolyte channel 32 and thence through the vent tube to the atmosphere. When electrolyte is added to the battery, it lies in channel 32 and is absorbed into the intercellular space between the electrodes since the ends of separators 24 overlie channel 32 and dip into the electrolyte held therein. This feature is shown more clearly in Fig. 22.

As mentioned heretofore, silver-zinc batteries require a relatively small amount of free electrolyte for proper cell activity. This electrolyte may be safely contained within the battery during any period when the battery is inverted, because of the length of the downwardly extending edges 62, 64 of vent conduits 60 and 54 respectively. If the battery should be inverted, the electrolyte will lie in pockets adjacent the vent and below the level of the inverted height of edges 62, 64.

To assemble a battery, several separator sheets are first carefully laid upon the negative side of the plate, such as plate 10, containing properly dried positive and negative electrode material. Then a mating plate, such as plate 12, is placed on top of the pile of separator material 24. As the various walls and depressions in corresponding plates register with one another there is a positive locking action between mating plates. Thus it will be seen that the terminal voltage of the battery will depend merely on the number of plates assembled in a stacked relationship. When a sufficient number of cells have been assembled, end plates 74, 76 of Figs. 10-19 are added to the positive and negative ends of the battery, respectively.

The outwardly facing plastic plate of each end cell of the battery has electrode material on only one side which is, of course, that side which faces inwardly towards the next adjacent cell. Thus, one end of the battery will have a cell plate with no negative material in its cavity 36, indicating that this is the positive end of the battery, and the opposite end will have no positive material in cavity 40 of the last cell plate, thus indicating that this is the negative end of the battery.

Terminals for each polarity are provided by conductor straps 78 which are attached to the end electrodes by welding them to pin 22 instead of to a succeeding wire screen. End plate 70 of Figs. 11, 17 is adapted to engage with the positive end of the battery and thus has a pair of ridges 80 which serve merely to align the plate with walls 28 of the empty electrolyte channel 32 of an end plate similar to plate 10 or 12. Since a complementary electrode support plate would have no negative electrode material, it would be the positive end of the battery. Therefore, plate 80 has a suitable positive designation 82 molded therein. Molded in end plate 74 are also a plurality of ribs 84 which serve merely to add structural strength to the stacked battery. Slots 86 are also molded in plate 74 to receive the positive conducting strap 78 (Fig. 3).

End plate 76 of Figs. 10, 14 is similar to plate 74 except that it is adapted to engage with the negative end cell plate of the battery, that is, that plate which has no positive electrode material. Thus end plate 76 has a narrow ridge 88 (Fig. 14) near its outer perimeter which is adapted to engage with shoulder 30 of a complementary side of a plate similar to plate 10 or 12, and plate 76 also has a plurality of ribs 84 which serve as structural strengthening of the battery pile. Plate 76 also has a slot 86 adapted to receive the negative conducting strap 78 (Fig. 12) of the battery. The negative designation 90 may be molded in end plate 76.

When the desired number of cells and end plates 74, 76 have been assembled into a stacked pile, the battery is coated with a suitable plastic cement 100.

Batteries of the silver zinc type are often stored dry and their activation is deferred until some later time when the electrolyte is added. As shown in Figs. 3-21, according to the present invention, the battery is sealed with a rubber membrane 92 which completely covers the vent holes and protects the cells internally until it is desired to activate the battery. Activation may be carried out by puncturing membrane 92 at each vent position and injecting the electrolyte into the interior of each cell. If a small sized electrolyte injection needle is used, the punctures in the membrane will substantially seal off the battery again once it has been activated, but a sufficiently small orifice will remain in the membrane 92 above each vent to allow gases generated within the battery to escape therethrough.

For facilitating the electrolyte injection, a molded plastic or synthetic resinous block 94 is provided which has a plurality of bores 96 which, when the block is fitted in place along the top of the battery, are adapted to be in axial alignment with the vent openings in each cell. Bores 96 serve as guides for the needles of the electrolyte injecting apparatus. To prevent bores 96 from being contaminated with dirt or other substances while the battery is not in use and in an unactivated state, a strip of plastic or other suitable non-porous material 98 is placed across the top of strip 94 to cover the apertures 96 therein. Of course, when activation is desired, strip 98 is first removed. To completely seal the battery from the atmosphere, rubber strip 92 is cemented into place with a suitable cement and strip 94 is pressed tightly thereagainst and similarly cemented with the cement filling all areas between strip 94 and the walls of the battery, such as, for example, areas 100, Fig. 21. In this way a complete seal of the battery is assured.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

We claim:

1. A battery comprising a plurality of tray-like insulating electrode supports molded from resinous insulating material, electrode separators formed from sheets of bibulous material interposed between said supports, and end closure plates abutting each end of said battery, each of said electrode supports having integral shallow recesses on its opposite faces, electrode material seated in each of said recesses, separate conducting means associated with each of said supports and passing therethrough to electrically interconnect only said electrode material in said recesses, said separators extending beyond the boundaries of said recesses to completely cover said electrode material, each of said supports having an outwardly extending ridge delineating the boundaries of one side thereof and a complementary peripheral groove in alignment therewith on the opposite side thereof, said ridge of a first electrode support and said groove of a second electrode support mating with each other to align said supports in a parallel stacked arrangement when said supports are assembled in abutting relationship, and means for maintaining said end closure plates, and separators, and said aligned electrode supports in rigid abutting alignment with each other.

2. The invention defined in claim 1 wherein said end closure plates have outwardly extending slotted portions for receiving terminal strips connected to the electrode material of the end electrodes of said battery to provide positive and negative terminals therefor.

3. An electrode support for use in a pile type battery comprising a tray-like member formed from insulating material having spaced inner and outer ridges on one side thereof, said inner ridges defining a shallow recess, a second shallow recess integrally disposed on the opposite side of said member in register with said first named recess, electrode material of opposite polarity seated in each of said recesses, said inner and outer ridges being spaced to define a channel for guiding electrolyte fluid around the outer perimeter of one of said filled recesses when said support member is arranged in an abutting relationship with a second complementary support member, and conducting means passing through said support member and secured to said electrode material for electrically connecting said material in said recesses.

4. The invention defined in claim 3 wherein said outer ridge defines the perimeter of one side of said support member and said support member has a complementary peripheral groove on the side opposite from said outwardly extending ridges and in alignment with said outer ridge, said groove being adapted to mate with a complementary outer ridge of an adjacent support member to secure said electrode supports in parallel alignment when said electrode support is assembled in abutting relationship with other supports to form a battery.

5. The invention defined in claim 3 including mesh screen members seated in each of said recesses with said electrode material supportably secured to said screens, and wherein said separate connecting means includes a pin passing through said support and connected to each of said screen members, said support having an aperture therein for receiving said pin and an annular sealing ring of resilient material interposed between said pin and the walls of said aperture.

6. A battery comprising a plurality of electrode separators formed from bibulous sheet material, electrode supports, and end closure plates abutting each end of said battery, said electrode supports being molded from electrical insulating material, a first shallow recess integrally formed on one side of said support, electrode material of a first polarity seated in said recess, the side of said support opposite said recess having spaced outer and inner ridges defining a first channel therebetween, said outer ridge defining the perimeter of said support, said inner ridge enclosing a second recessed area having second electrode material of opposite polarity from said first electrode material seated therein, said first and second recesses lying disposed in register with each other, a second channel extending through said outer ridge and communicating with said first channel, a grooved portion extending to the outer periphery of said support on said first recessed side and adapted to mate with said second channel in a complementary adjacent support to form a vent for conducting electrolyte into said first channel when said supports are aligned in an assembled relationship, separate conducting means associated with each of said supports and passing therethrough to electrically interconnect only said electrodes of opposite polarity, each side of said supports having means to mating with a complementary surface of an adjacent support to secure said supports in parallel abutting alignment to form a stacked assembly, at least one of said separators being interposed between adjacent supports and having an edge disposed in said first channel so that electrolyte is absorbed therefrom, and means for maintaining said end closure plates and said electrode supports in rigid abutting relationship with each other.

7. A battery comprising a plurality of tray-like, insulating electrode supports molded from resinous, electrode separators formed from sheets of bibulous material, end closure plates abutting each end of said battery, each of said electrode supports having spaced inner and outer ridges on one side thereof, said inner ridges defining a shallow recess, a second shallow recess integrally disposed on the opposite side of each of said supports in register with said first-named recess, electrode material of opposite polarity seated in each of said recesses, said inner and outer ridges being spaced to define a channel for guiding electrolyte fluid around the outer perimeter of one of said filled recesses, a peripheral groove complementary to said outer ridge in alignment therewith and disposed on each of said supports on the opposite side thereof with respect to said outer ridge, said ridge of a first electrode support and said groove of a second electrode support mating with each other to align said supports in a parallel stacked arrangement when said supports are assembled in abutting relationship, at least one of said bibulous separators extending beyond the boundaries of said recess to completely cover said electrode material, said separator being interposed between adjacent supports and held in alignment therebetween by pressure from said inner ridge against an adjacent electrode support, at least one edge of said separator being disposed in said channel so that electrolyte is absorbed therefrom, separate conducting means associated with each of said supports and passing therethrough to connect only said electrode material in said recesses, and means for maintaining said end closure plates and said electrode supports in rigid abutting registry with each other.

8. A battery comprising a plurality of tray-like, insulating electrode supports molded from resinous insulating material and arranged in parallel, abutting alignment to form a stacked assembly, electrode separators formed from sheets of bibulous material, end closure plates abutting each end of said battery, each of said electrode supports having spaced inner and outer ridges on one side thereof, said inner ridges defining a shallow recess, a second shallow recess integrally disposed on the opposite side of each of said supports in register with said first-named recess, electrode material of opposite polarity seated in each of said recesses, said inner and outer ridges being spaced to define a channel for guiding electrolyte fluid around the outer perimeter of one of said filled recesses, at least one of said bibulous separators being interposed between adjacent, aligned supports and held in alignment therebetween by pressure from said inner ridge against an adjacent plate and having an edge disposed in said channel so that electrolyte is absorbed therefrom, separate conducting means associated with each of said supports and passing therethrough to connect only said electrode material in said recesses, and means for maintaining said end closure plates, said separators, and said electrode supports in rigid, abutting alignment with one another.

References Cited in the file of this patent

UNITED STATES PATENTS

| | | |
|---|---|---|
| 401,289 | Main | Apr. 9, 1889 |
| 477,914 | Silvey | June 28, 1892 |
| 895,549 | Ford | Aug. 11, 1908 |
| 1,377,194 | Edison | May 10, 1921 |
| 2,379,374 | Payne | June 26, 1945 |
| 2,727,079 | Chubb et al. | Dec. 13, 1955 |
| 2,727,082 | Chubb et al. | Dec. 13, 1955 |